(12) United States Patent
Tobbe et al.

(10) Patent No.: US 12,397,254 B2
(45) Date of Patent: Aug. 26, 2025

(54) AIR CONDITIONING APPLIANCE AND MAKE-UP AIR FILTER TRAY

(71) Applicant: Haier US Appliance Solutions, Inc., Wilmington, DE (US)

(72) Inventors: Joseph Robert Tobbe, Louisville, KY (US); Charles D. Robinson, III, Louisville, KY (US); Timothy Scott Shaffer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 608 days.

(21) Appl. No.: 17/830,663

(22) Filed: Jun. 2, 2022

(65) Prior Publication Data

US 2023/0390683 A1 Dec. 7, 2023

(51) Int. Cl.
*B01D 46/00* (2022.01)
*B01D 46/24* (2006.01)
*F24F 3/16* (2021.01)
*F24F 8/108* (2021.01)

(52) U.S. Cl.
CPC ..... *B01D 46/0009* (2013.01); *B01D 46/0049* (2013.01); *B01D 46/2411* (2013.01); *F24F 3/16* (2013.01); *F24F 8/108* (2021.01); *B01D 2273/30* (2013.01); *B01D 2279/50* (2013.01)

(58) Field of Classification Search
CPC ............ B01D 46/0009; B01D 46/0049; B01D 46/2411; B01D 2273/30; B01D 2279/50; F24F 3/16; F24F 8/108; F24F 1/029; F24F 1/035; F24F 1/027; F24F 13/20; F24F 13/28

See application file for complete search history.

(56) References Cited

U.S. PATENT DOCUMENTS

| | | | | |
|---|---|---|---|---|
| 3,831,395 A | * | 8/1974 | Levy | F24F 1/035 62/297 |
| 5,992,160 A | * | 11/1999 | Bussjager | F25B 40/02 62/99 |
| 6,009,716 A | * | 1/2000 | Aoto | F24F 1/027 62/262 |
| 6,076,370 A | * | 6/2000 | Da Silva | F24F 13/28 62/262 |

(Continued)

FOREIGN PATENT DOCUMENTS

| | | |
|---|---|---|
| KR | 20060078454 A | 7/2006 |
| WO | WO2011077971 A1 | 6/2011 |
| WO | WO2020177344 A1 | 9/2020 |

*Primary Examiner* — Dung H Bui
(74) *Attorney, Agent, or Firm* — Dority & Manning, P.A.

(57) ABSTRACT

A single-package air conditioner unit includes a housing defining an outdoor portion and an indoor portion, an outdoor heat exchanger assembly disposed in the outdoor portion and comprising an outdoor heat exchanger and an outdoor fan, an indoor heat exchanger assembly disposed in the indoor portion and comprising an indoor heat exchanger and an indoor fan, an intake conduit extending from the housing and defining a primary air flow path upstream from the indoor heat exchanger assembly and a make-up air (MUA) air flow path, the MUA air flow bath being non-sequential with the primary air flow path, and a filter tray received within the intake conduit along the MUA air flow path, the filter tray defining a filter reception zone within the intake conduit to receive a filter cartridge therein.

18 Claims, 4 Drawing Sheets

(56) References Cited

U.S. PATENT DOCUMENTS

| | | | |
|---|---|---|---|
| 9,841,198 B2* | 12/2017 | Junge | F24F 11/83 |
| 2017/0176056 A1* | 6/2017 | Eicher | F24F 13/20 |
| 2020/0278128 A1 | 9/2020 | Patel et al. | |
| 2021/0071881 A1* | 3/2021 | Shaffer | F24F 1/0358 |
| 2021/0071903 A1 | 3/2021 | Baumann et al. | |
| 2021/0404671 A1* | 12/2021 | Shaffer | F24F 1/0373 |
| 2021/0404704 A1* | 12/2021 | Phillips | F24F 1/035 |
| 2022/0333814 A1* | 10/2022 | Sakal | F24F 13/029 |
| 2022/0364760 A1* | 11/2022 | Shaffer | F24F 12/002 |
| 2022/0412576 A1* | 12/2022 | Leezer | F24F 13/28 |
| 2023/0349564 A1* | 11/2023 | Ewing | F24F 1/027 |
| 2023/0390683 A1* | 12/2023 | Tobbe | F24F 3/16 |

* cited by examiner

AIR CONDITIONING APPLIANCE AND MAKE-UP AIR FILTER TRAY

FIELD OF THE INVENTION

The present subject matter relates generally to air conditioning appliances, and more particularly to assemblies for providing make-up air to air conditioning appliances.

BACKGROUND OF THE INVENTION

Air conditioner or air conditioning appliance units are conventionally used to adjust the temperature within structures such as dwellings and office buildings. In particular, one-unit type room air conditioner units, such as single-package vertical units (SPVU), may be used to adjust the temperature in, for example, a single room or group of rooms of a structure. A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through the indoor portion of the air conditioner unit. One or more control boards are typically provided to direct the operation of various elements of the particular air conditioner unit.

Frequently, the indoor space may need to draw in air from the outdoors (i.e., make-up air). For example, if a vent fan is turned on in a bathroom or air is otherwise ejected from the indoor space, fresh air from the outdoors is required. Depending on, for example, the efficiency of the weather stripping around doors and windows, some make-up air could simply be drawn into the indoors by cracks or other openings. If such cracks are not sufficient, the flow of make-up air may be insufficient or too slow. Furthermore, government regulations, such as air flow regulations, may require that a sufficient flow of make-up air meet a minimum air flow amount. Accordingly, an air conditioner unit that can allow for the introduction of make-up air into the indoor space that meets or exceeds air flow standard amounts would be useful.

As a result, it would be useful to provide an air conditioning appliance that includes features for addressing one or more of the above issues. In particular, it may be advantageous to provide an appliance or assembly with features for filtering make-up air without sacrificing air flow amounts to an air conditioning unit.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a single-package air conditioner unit is provided. The single-package air conditioner unit may include a housing defining an outdoor portion and an indoor portion; an outdoor heat exchanger assembly disposed in the outdoor portion and including an outdoor heat exchanger and an outdoor fan; an indoor heat exchanger assembly disposed in the indoor portion and including an indoor heat exchanger and an indoor fan; an intake conduit extending from the housing and defining a primary air flow path upstream from the indoor heat exchanger assembly and a make-up air (MUA) air flow path, the MUA air flow path being non-sequential with the primary air flow path; and a filter tray received within the intake conduit along the MUA air flow path, the filter tray defining a filter reception zone within the intake conduit to receive a filter cartridge therein.

In another exemplary aspect of the present disclosure, a single-package air conditioner unit is provided. The single-package air conditioner unit may include a housing defining an outdoor portion and an indoor portion; an outdoor heat exchanger assembly disposed in the outdoor portion and including an outdoor heat exchanger and an outdoor fan; an indoor heat exchanger assembly disposed in the indoor portion and including an indoor heat exchanger and an indoor fan; an intake conduit extending from the housing and defining a primary air flow path upstream from the indoor heat exchanger assembly and a make-up air (MUA) air flow path, the MUA air flow path being non-sequential with the primary air flow path; and a filter tray removably received within the intake conduit along the MUA air flow path, the filter tray defining a filter reception zone within the intake conduit to receive a filter cartridge therein, wherein the MUA air flow path has a minimum airflow cross-section that is less than a minimum airflow cross-section of the primary air flow path, and wherein an air flow direction of the MUA air flow path is different from an air flow direction of the primary air flow path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
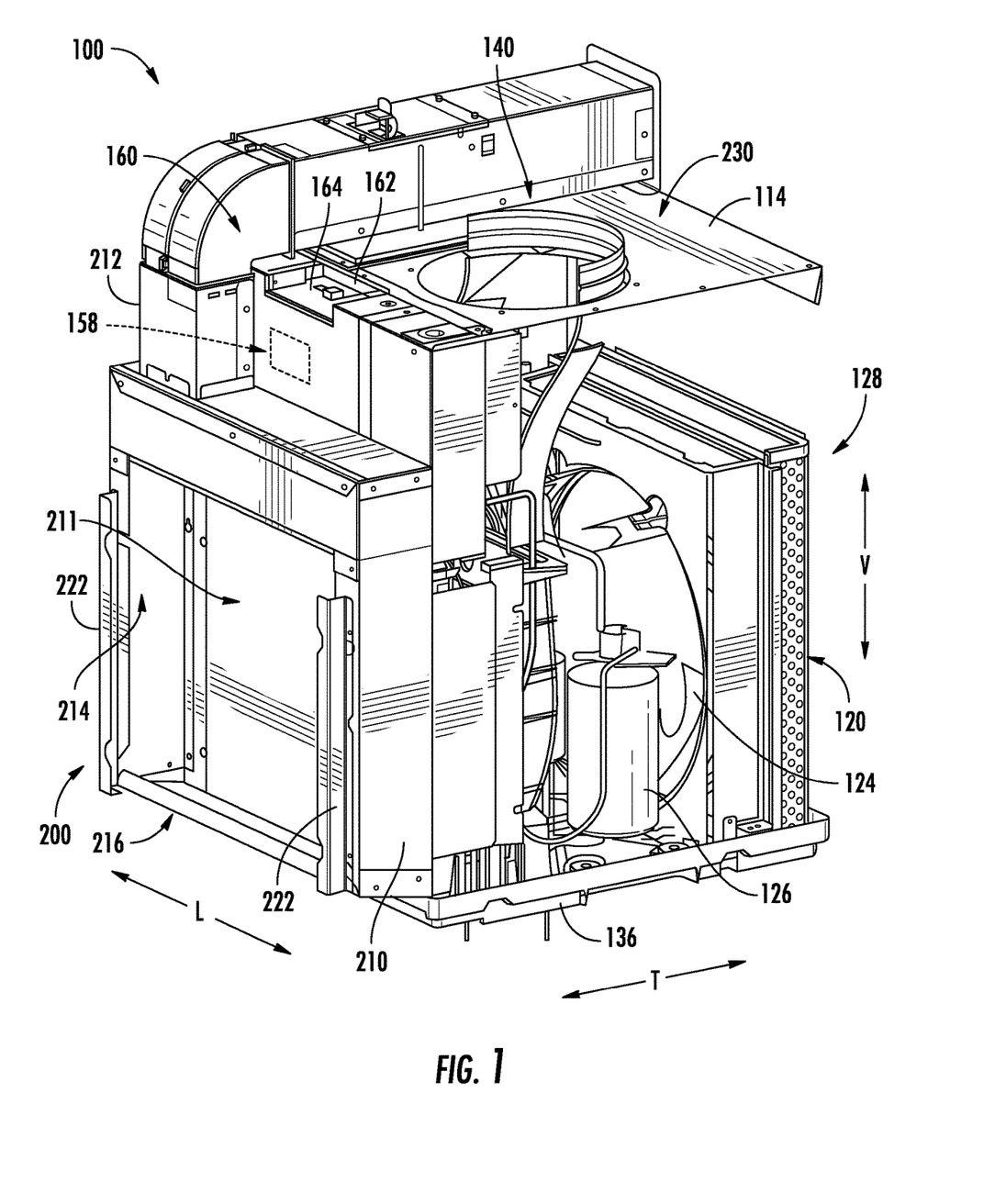
FIG. 1 provides a perspective view of an air conditioning appliance according to exemplary embodiments of the present disclosure.
Figure 2:
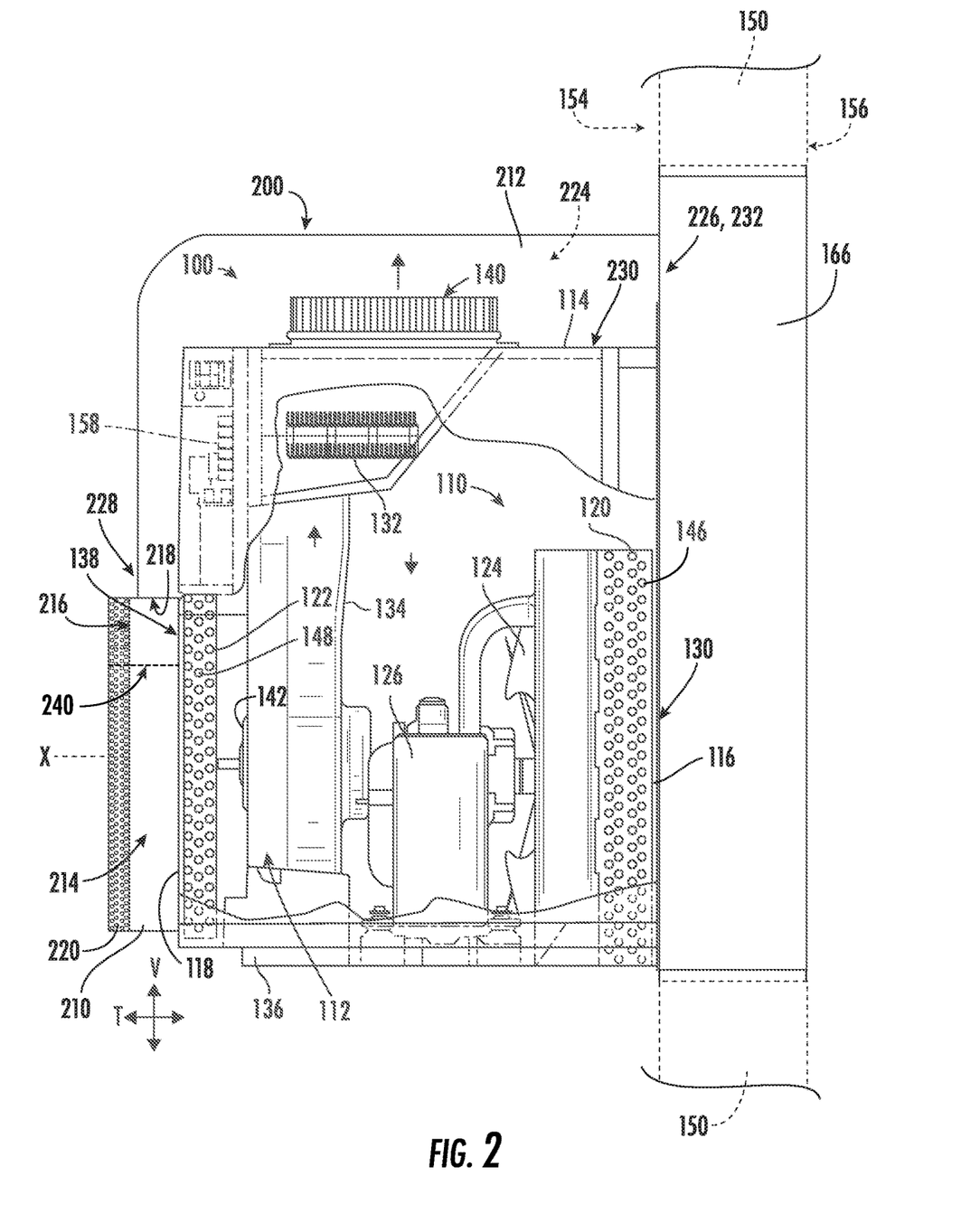
FIG. 2 provides a partially-transparent elevation view of the exemplary air conditioner unit of FIG. 1.

Turning now to the figures, FIGS. 1 and 2 illustrate an exemplary air conditioner appliance (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110. Generally, air conditioner 100 defines a vertical direction V, lateral direction L, and transverse direction T. Each direction V, L, T is perpendicular to each other, such that an orthogonal coordinate system is generally defined.

In some embodiments, housing 114 contains various other components of the air conditioner 100. Housing 114 may include, for example, a rear opening 116 (e.g., with or without a grill or grate thereacross) and a front opening 118 (e.g., with or without a grill or grate thereacross) may be spaced apart from each other along the transverse direction T. The rear opening 116 may be part of the outdoor portion 110, while the front opening 118 is part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components of outdoor portion 110 are mounted on a base pan 136, as shown.

During certain operations, air may be drawn to outdoor portion 110 through rear opening 116. Specifically, an outdoor inlet 128 defined through housing 114 may receive outdoor air motivated by outdoor fan 124. Within housing 114, the received outdoor air may be motivated through or across outdoor fan 124. Moreover, at least a portion of the outdoor air may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable discrete orientation.

As shown, indoor portion 112 may include an indoor heat exchanger 122, a blower fan 142, and a heating unit 132. These components may, for example, be housed behind the front opening 118. A bulkhead 134 may generally support or house various other components or portions thereof of the indoor portion 112, such as the blower fan 142. Bulkhead 134 may generally separate and define the indoor portion 112 and outdoor portion 110 within housing 114. Additionally or alternatively, bulkhead 134 or indoor heat exchanger 122 may be mounted on base pan 136 (e.g., at a higher vertical position than outdoor heat exchanger 120), as shown.

During certain operations, air may be drawn to indoor portion 112 through front opening 118. Specifically, an indoor inlet 138 defined through housing 114 may receive indoor air motivated by blower fan 142. At least a portion of the indoor air may be motivated through or across indoor heat exchanger 122 (e.g., before passing to bulkhead 134). From blower fan 142, indoor air may be motivated (e.g., across heating unit 132) and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchanger 120, 122 may be components of a thermodynamic assembly (i.e., sealed system), which may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

The sealed system may, for example, further include compressor 126 (e.g., mounted on base pan 136) and an expansion device (e.g., expansion valve or capillary tube—not pictured), both of which may be in fluid communication with the heat exchangers 120, 122 to flow refrigerant therethrough, as is generally understood. The outdoor and indoor heat exchanger 120, 122 may each include coils 146, 148, as illustrated, through which a refrigerant may flow for heat exchange purposes, as is generally understood.

It is noted that although a sealed system is described above (e.g., as a thermodynamic assembly), one of ordinary skill in the art would, in light of the present disclosure, understand that such a sealed system may be substituted for other suitable heat-exchange systems, such as a system relying on shape-memory alloys (SMA). For instance, a pair of discrete fluid circuits (e.g., a hot circuit and a cold circuit) each having a discrete volume of heat-carrying fluid (e.g., water, brine, glycol, air, etc.) may be separately connected to a compression unit—the compression unit housing a plurality of plate stacks each having one or more plates formed from one or more SMA material (e.g., copper-nickel-aluminum or nickel-titanium). Separate heat exchangers may generally be provided on the circuits in place of the evaporator and the condenser of a sealed system. In particular, a first heat exchanger may be provided on the cold circuit (e.g., in place of the evaporator) to absorb heat from the adjacent air and impart such absorbed heat to the heat-carrying fluid within the cold circuit. Thus, the first heat exchanger may also be referred to as an "evaporator" herein. Similarly, a second heat exchanger may be provided on the hot circuit (e.g., in place of the condenser) to release heat to the adjacent air from the heat-carrying fluid within the hot circuit. Thus, the second heat exchanger may also be referred to as a "condenser" herein.

The compression unit may facilitate or direct heat between the circuits. As an example, the compression unit may have four discrete plate stacks, each being separately compressed or released by a corresponding mechanical press or vice (e.g., hydraulic ram or electric actuator). During use, the plate stacks may be compressed and released (e.g., alternated between a compressed state or stroke and a released state or stroke) separately such that at any given moment one plate stack is compressed, one plate stack is released, one plate stack is mid-compression, and one plate stack is mid-release. Heat-carrying fluid in the cold circuit may flow through the first heat exchanger, before being directed (e.g., by a series of valves or pumps) into the plate stack that is currently compressed. The compressed plate stack may then be moved to the released state, in turn absorbing heat from the heat-carrying fluid before the heat-carrying fluid within the now-released plate stack is returned to the cold circuit (e.g., to repeat the cycle). In contrast to the cold circuit, heat-carrying fluid in the hot circuit may flow through the second heat exchanger and be directed (e.g., by a separate series of valves or pump) into the plate stack that is currently released. The released plate stack may then be compressed (i.e., moved to the compressed stated), in turn releasing heat from the plate stack to the heat-carrying fluid before the heat-carrying fluid within the now-compressed plate stack is returned to the hot circuit (e.g., to repeat the cycle). The use of four plate stacks may allow both circuits to run continuously.

A plenum 166 may be provided to direct air to or from housing 114. When installed, plenum 166 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed). For instance, plenum 166 may extend (e.g., parallel to the transverse direction T) through a hole or channel in the structure wall 150 that passes from an internal surface 154 to an external surface 156.

As will be described in greater detail below, a make-up air assembly 200 may be provided to selectively direct outdoor or make-up air to the indoor portion 112. Specifically, make-up air assembly 200 may direct outdoor air through the structure outer or wall 150 of the structure within which air conditioner 100 is installed (e.g., via plenum 166) and to indoor heat exchanger 122 without first directing such outdoor or make-up air through housing 114. To that end, make-up air assembly 200 may include one or more air ducts or conduits (e.g., intake conduit 210 or secondary air duct 212) defining one or more air paths outside of housing 114. During use, the flow of make-up air may thus be fluidly isolated from the flow of air through outdoor portion 110.

The operation of air conditioner 100 including compressor 126 (and thus the sealed system generally), blower fan 142, outdoor fan 124, heating unit 132, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs or the like, such as general or special purpose microprocessors operable to execute programming instructions or micro-control code associated with operation of air conditioner 100. The memory may be a separate component from the processor or may be included onboard within the processor. The memory may represent random access memory such as DRAM, or read only memory such as ROM or FLASH.

Air conditioner 100 may additionally include a control panel 160 and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display 164 may additionally be provided in the control panel 160, and may be in communication with the controller 158. Display 164 may, for example be a touchscreen or other text-readable display screen, or alternatively may simply be a light that can be activated and deactivated as required to provide an indication of, for example, an event or setting for the air conditioner 100.

As noted above, make-up air assembly 200 may be generally provided to selectively direct outdoor air to the indoor portion 112. To that end, make-up air assembly 200 may include an intake conduit 210 that defines an intake passage 214 upstream from indoor inlet 138. As shown, intake conduit 210 extends outward from housing 114. For instance, intake passage 214 may extend along a passage axis X (e.g., horizontal or parallel to the transverse direction T), which the intake conduit 210 generally surrounds or radially bounds. In some such embodiments, intake passage 214 is parallel to passage axis X. When assembled, intake conduit 210 may be mounted to housing 114, such as on an outer surface 230 of housing 114. In turn, intake passage 214 may extend from a primary air inlet 216 (i.e., primary inlet), which is defined as an opening or aperture of intake conduit 210, to indoor inlet 138. Thus, primary air inlet 216 is spaced apart from indoor inlet 138 (e.g., along the transverse direction T). In some embodiments, primary air inlet 216 is coaxial with indoor inlet 138. For instance, both primary air inlet 216 and indoor inlet 138 may be defined along the passage axis X. In turn, intake passage 214 may be a linear passage from primary air inlet 216 to indoor inlet 138.

Generally, primary air inlet 216 defines an airflow cross section (e.g., minimum cross section) along a plane perpendicular to airflow through primary air inlet 216. For instance, in the illustrated embodiments, the airflow cross section of primary air inlet 216 is defined by the dimensions of a height multiplied by a width thereof.

Along with defining primary air inlet 216, intake conduit 210 may define a secondary air inlet 218 (i.e., secondary inlet). In particular, secondary air inlet 218 may be defined separate from primary air inlet 216. When assembled, secondary air inlet 218 may be spaced apart from primary air inlet 216. For instance, secondary air inlet 218 may be defined in fluid parallel (e.g., non-sequential) to primary air inlet 216. Thus, airflow through secondary air inlet 218 to intake passage 214 may be distinct from airflow through primary air inlet 216. Moreover, upstream from intake passage 214, the airflows through secondary air inlet 218 and primary air inlet 216 may be independent from (i.e., not commingled with) each other.

In some embodiments, secondary air inlet 218 is defined along a non-parallel angle relative to primary air inlet 216 (i.e., such that primary air inlet 216 and secondary air inlet 218 are not defined along geometric parallel axes). For instance, secondary air inlet 218 may be defined through intake conduit 210 perpendicular to primary air inlet 216 (e.g., perpendicular to passage axis X). In optional embodiments, secondary air inlet 218 is defined above primary air inlet 216. Thus, airflow through secondary air inlet 218 to intake passage 214 may flow downward. In additional or alternative embodiments, secondary air inlet 218 is closer to indoor inlet 138 (e.g., relative to the passage axis X) than primary air inlet 216. Thus, secondary air inlet 218 may be proximal to indoor inlet 138 while primary air inlet 216 is distal to indoor inlet 138.

Generally, secondary air inlet 218 defines an airflow cross section (e.g., minimum cross section) along a plane perpendicular to airflow through secondary air inlet 218. For instance, in the illustrated embodiments, the airflow cross section of secondary air inlet 218 is defined by the dimensions of a length multiplied by a width thereof. In certain embodiments, the airflow cross section of secondary air inlet 218 is less than the airflow cross section of primary air inlet 216.

As shown, a filter panel 220 may be disposed (e.g., selectively or removably disposed) on intake conduit 210. In particular, filter panel 220 may be disposed in fluid communication with intake passage 214 to filter air thereto. For instance, filter panel 220 may be in fluid communication with primary air inlet 216 while being spaced apart from secondary air inlet 218. During use, airflow to intake passage 214 through primary air inlet 216 may thus be forced through filter panel 220 in order to flow to intake passage 214. By contrast, airflow to intake passage 214 through secondary air inlet 218 may advantageously bypass filter panel 220 altogether. Optionally, indoor inlet 138 may be unobstructed by any filtration media, ensuring a direct flow path from intake passage 214 to the indoor portion 112. Notably, bypassing filter panel 220 may prevent significant resistance to make-up air (e.g., while ensuring filtration of most of the airflow, such as the non-makeup airflow to indoor inlet 138).

In some embodiments, filter panel 220 is disposed in front primary air inlet 216 (e.g., along the transverse direction T or otherwise outside from intake passage 214). Moreover, filter panel 220 may be upstream from primary air inlet 216. One or more mounting brackets 222 may be provided to hold filter panel 220 on intake conduit 210. For instance, as illustrated, a pair of mounting brackets 222 that each defining a discrete support channel to slidably receive filter panel 220 may be provided on opposite ends (e.g., opposite lateral ends or vertical ends) of intake conduit 210 or primary air inlet 216. As shown, each mounting bracket 222 may be opened at one end (e.g., a top end) while being closed at an opposite end (e.g., a bottom end) to support filter panel 220 or otherwise prevent filter panel 220 from sliding directly through (i.e., out of) the mounting brackets 222 during installation of filter panel 220 on intake conduit 210. Filter panel 220 itself may be provided as any suitable frame or structure including a suitable air filtration media (e.g., cellulose, fiberglass, foam, etc.).

In some embodiments, a secondary air duct 212 is mounted or attached to intake conduit 210 to direct outdoor (i.e., make-up) air to secondary air inlet 218. Thus, secondary air duct 212 may be disposed upstream from secondary air inlet 218 to direct air thereto. Moreover, secondary air duct 212 may define a secondary passage 224 that extends from an outdoor end 226 to an indoor end 228. In certain embodiments, outdoor end 226 is positioned at or proximal to plenum 166 while indoor end 228 is positioned at or proximal to secondary air inlet 218, as shown.

When assembled, secondary air duct 212 may extend from intake conduit 210 outside of housing 114. Thus, secondary passage 224 may be defined outside of housing 114 apart from indoor portion 112 and outdoor portion 110. In certain embodiments, secondary air duct 212 is disposed on outer surface 230 of housing 114. Thus, while secondary air duct 212 is separate from housing 114, secondary air duct 212 may be held to housing 114 (e.g., as a single unit) without commingling air through outdoor portion 110 and secondary passage 224, or without motivating air within housing 114 across an exterior surface of secondary air duct 212 (e.g., opposite from the interior secondary passage 224). Optionally, an insulation layer (e.g., insulating foam, sheet, or panels) may be disposed on the exterior surface of secondary air duct 212 outside of housing 114.

Outdoor end 226 of secondary air duct 212 defines a duct intake 232 through which outdoor or make-up air may enter secondary passage 224. In certain embodiments, duct intake 232 may be disposed directly above the outdoor outlet 130 (e.g., at the plenum 166). In order to direct air from an outdoor region to intake conduit 210, duct intake 232 is generally offset or spaced apart from secondary air inlet 218 in or along at least one direction (e.g., the transverse direction T). As shown, duct intake 232 may further be offset from secondary air inlet 218 in a second direction (e.g., in the vertical direction V or lateral direction L). In the illustrated embodiments, indoor end 228 (and thus secondary air inlet 218) is both horizontally and vertically offset from duct intake 232. For instance, secondary air inlet 218 may be transversely offset and lower than the duct intake 232. Airflow through secondary passage 224 may thus be drawn forward and downward, notably maintaining a compact assembly while minimizing the resistance of airflow through secondary passage 224.

Figure 3:
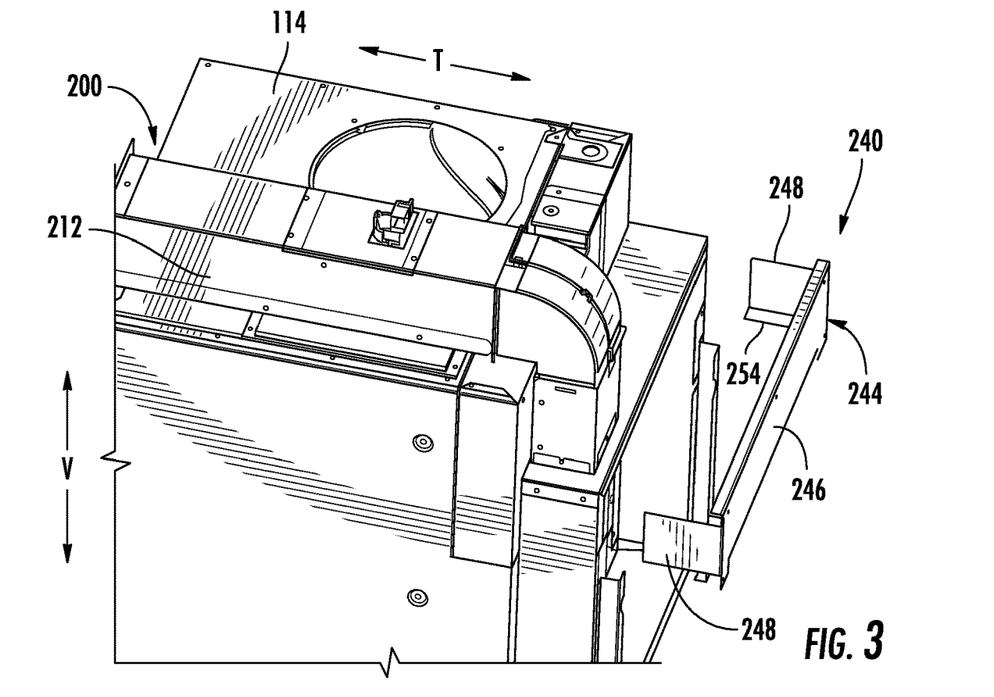
FIG. 3 provides another perspective view of the exemplary air conditioner unit of FIG. 1 with a filter tray removed.
Figure 4:
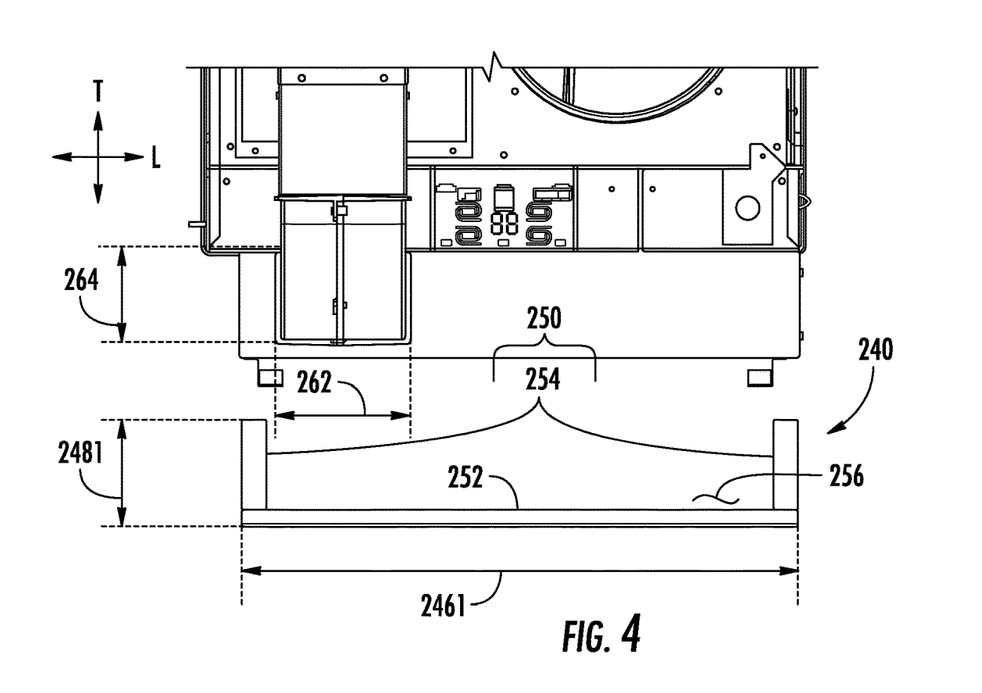
FIG. 4 provides a top view of the exemplary air conditioner unit of FIG. 1 with the filter tray removed.
Figure 5:
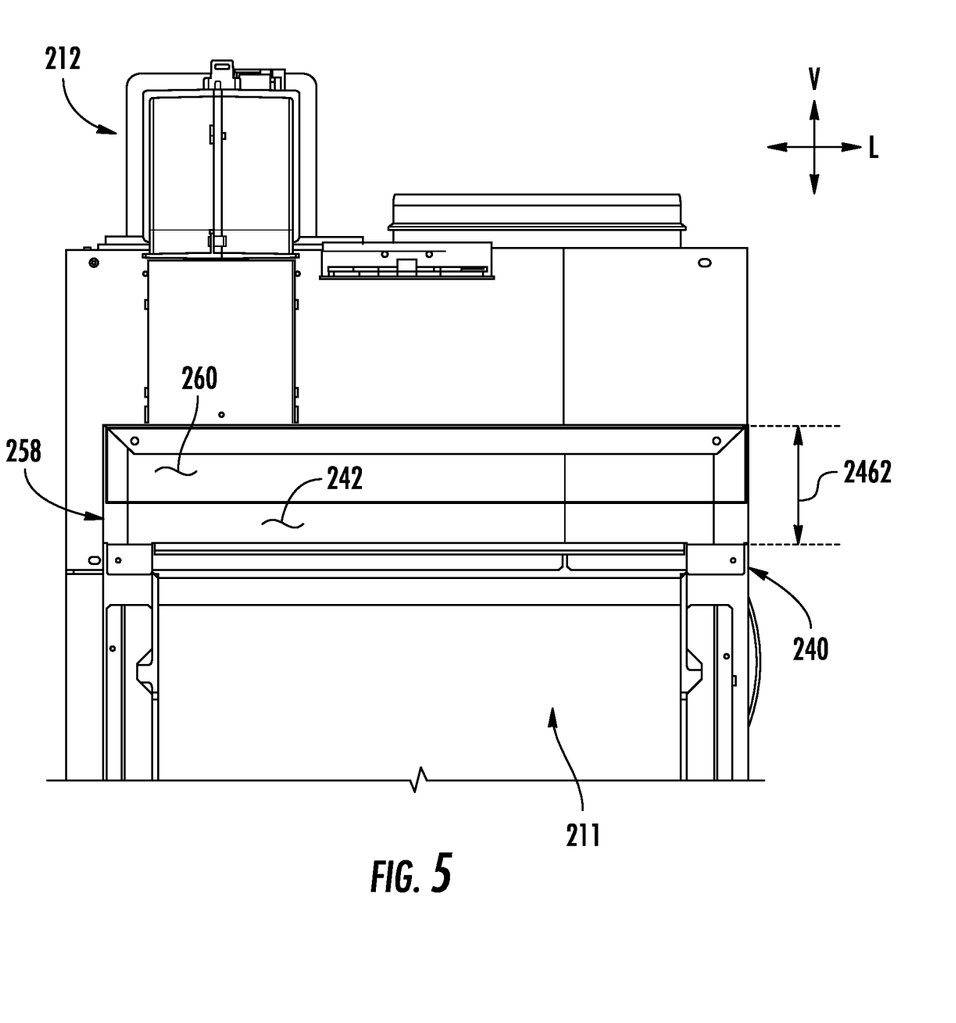
FIG. 5 provides a front view of the exemplary air conditioner unit of FIG. 1.

Referring now generally to FIGS. 3 through 5, MUA assembly 200 may include a filter tray 240. As described above, air from the outdoor region (make-up air, MUA) may be directed into intake conduit 210 via secondary air duct 212 (e.g., through secondary air inlet 218). Further, the MUA may be introduced into intake conduit 210 downstream from filter panel 220 (e.g., main flow or primary flow filter panel 220). Accordingly, filter tray 240 may be accommodated within intake conduit 210. In detail, filter tray 240 may be removably received within intake conduit 210 along a MUA air flow path (e.g., defined through secondary air duct 212 and intake conduit 210). Thus, a secondary or MUA filter cartridge 258 may be selectively accommodated within filter tray 240. For instance, filter tray 240 may define a filter reception zone 242 within intake conduit 210. Secondary filter cartridge 258 may be provided within filter reception zone 242.

Filter tray 240 may include a main body panel 244. Main body panel 244 may include a front panel 246 and a pair of side panels 248 extending from front panel 246. Front panel 246 may be defined primarily along the vertical direction V and the lateral direction L. For instance, front panel 246 may define a width 2461 along the lateral direction L and a height 2462 along the vertical direction V. According to at least some embodiments, width 2461 is greater than height 2462. For instance, width 2461 may be about equal to a width along the lateral direction L of intake conduit 210. Thus, a width of filter reception zone 242 may be equal to width 2461 of front panel 246, and therefore equal to the width of intake conduit 210. Advantageously, the MUA air flow supplied to intake conduit 210 may be thoroughly filtered (e.g., by a MUA filter cartridge) before being introduced to indoor heat exchanger 122 and subsequently supplied to the indoor area.

The pair of side panel 248 may include first and second side panels 248. Each of the first and second side panels 248 may extend from front panel 246 (e.g., along the transverse direction T). Each of the first and second side panels 248 may be similarly provided (and mirrored about a plane defined along the vertical direction V and transverse direction T). Accordingly, a single side panel 248 will be described herein with the understanding that the description may apply to each of the pair of side panels 248.

Side panel 248 may extend a predetermined distance along the transverse direction T. For instance, side panel 248 may extend at a right angle with respect to front panel 246. Moreover, side panel 248 may be provided at or near a lateral edge of front panel 246. In detail, an extending length 2481 of side panel 246 may be approximately equal to a depth (along the transverse direction T) of intake conduit 210. Accordingly, a distal edge of side panel 248 may contact an inner surface 211 of intake conduit 210 (e.g., an exterior surface of housing 114). Moreover, filter reception zone 242 may be defined at least in part by extending length 2481 of side panel 248 and width 2461 of front panel 246. Advantageously, a full cross-section (e.g., along the vertical direction V) of the MUA air flow path may be within filter reception zone 242.

Filter tray 240 may include a plurality of flanges 250 extending from main body 244. For instance, the plurality of flanges 250 may extend toward filter reception zone 242 (e.g., along the lateral direction L and transverse direction T). In detail, the plurality of flanges 250 may include a front flange 252 and a pair of side flanges 254. Front flange 252 may extend from front panel 246. In detail, front flange 252 may extend at a right angle with respect to front panel 246. Front flange 252 may thus extend rearward (e.g., along the transverse direction T toward housing 114) from front panel 246. Additionally or alternatively, front flange 252 may extend from a bottom (e.g., along the vertical direction V) of front panel 246. Moreover, front flange 252 may extend to a predetermined distance from front panel 246. According to some embodiments, the extending length 2521 (e.g., along the transverse direction T) of front flange 252 is between about 10% and about 20% of extending length 2481 of side panel 248.

Similarly, the pair of side flanges 254 may extend from the pair of side panels 248, respectively. For instance, a first side flange 254 may extend toward filter reception zone 242 from a first side panel 248 while a second side flange 254 extends toward filter reception zone 242 from a second side panel 248. Additionally or alternatively, the pair of side flanges 254 may extend toward each other (e.g., along the lateral direction L) into filter reception zone 242. Hereinafter, a single side flange 254 will be described in detail with the understanding that the description applies to each side flange 254. Similar to front flange 252, side flange 254 may extend from a bottom (e.g., along the vertical direction V) of side panel 248. Moreover, side flange 254 may extend to a predetermined distance from side panel 248. According to some embodiments, the extending length 2541 (e.g., along the transverse direction T) of side flange 254 is between about 5% and about 10% of width 2461 of front panel 246. Collectively, front flange 252 and side flanges 254 may define a tray aperture 256 to permit air therethrough. In detail, tray aperture 256 may be defined along the lateral direction L between the pair of side flanges 254 and along the transverse direction T between front flange 252 and inner surface 211 of intake conduit 210.

A filter cartridge (e.g., MUA filter cartridge) 258 may be selectively supported by the plurality of flanges 250 (e.g., along the vertical direction V). In detail, filter cartridge 258 may rest on the plurality of flanges 250 within filter reception zone 242. An exemplary filter cartridge 258 is shown in FIG. 5. As shown in FIG. 5, filter cartridge 258 may be provided at or near a bottom (e.g., along the vertical direction V) of filter reception zone 242. For instance, filter cartridge 258 may occupy a certain percentage of space defined by filter tray 240 (e.g., three-dimensional space). For one example, a height 2581 of filter cartridge 258 is less than the height 2461 of front panel 246. Accordingly, a dispersion gap 260 may be formed therein.

Dispersion gap 260 may be defined within the MUA air flow path. According to some embodiments, dispersion gap 260 is provided above (e.g., along the vertical direction V) filter reception zone 242 (or above filter cartridge 258). Dispersion gap 260 may define a space between, for instance, secondary air duct (or MUA duct) 212 and filter reception zone 242. In detail, dispersion gap 260 may form an enlarged space above filter reception zone 242 for the make-up air to expand before entering filter cartridge 258. According to at least one example, a width (e.g., along the lateral direction L) of dispersion gap 260 is equal to a width (along the lateral direction L) of filter reception zone 242. Additionally or alternatively, a height (e.g. along the vertical direction V) of dispersion gap 260 may be greater than a height (along the vertical direction V) of filter reception zone 242. However, it should be noted that the relative heights of each of dispersion gap 260 and filter reception zone 242 may vary according to specific filter cartridges provided within filter reception zone 242.

MUA duct 212 (secondary air duct) may define a first cross-sectional area. For instance, MUA duct may define a width 262 along the lateral direction L and a length 264 along the transverse direction T. For purposes of this example, the cross-sectional area is determined at secondary air inlet 218. As shown in the FIGS., the cross-sectional area of MUA duct 212 is less than a cross-sectional area of dispersion gap 260. Accordingly, outside air supplied to intake conduit 210 via MUA duct 212 may expand within dispersion gap 260 before entering, e.g., filter cartridge 258. Advantageously, the outside (e.g., make-up) air may easily flow through filter cartridge 258 before being supplied to indoor heat exchanger 122. Accordingly, the flow rate of the make-up air may be maximized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A single-package air conditioner unit defining a vertical direction, a lateral direction, and a transverse direction, the single-package air conditioner unit comprising:
    a housing comprising an outdoor portion and an indoor portion, the indoor portion defining an indoor inlet for receipt of indoor air;
    an outdoor heat exchanger assembly disposed in the outdoor portion and comprising an outdoor heat exchanger and an outdoor fan;
    an indoor heat exchanger assembly disposed in the indoor portion and comprising an indoor heat exchanger and an indoor fan, the indoor heat exchanger being in downstream fluid communication with the indoor inlet;
    an intake conduit mounted to an outer surface of the housing, the intake conduit defining an intake passage upstream from the indoor inlet, the intake conduit further defining a primary air inlet upstream of the intake passage and a secondary air inlet upstream of the intake passage, the secondary air inlet being non-sequential with the primary air inlet;
    a make-up air (MUA) duct for directing outdoor air to the indoor portion, the MUA duct in upstream fluid communication with the secondary air inlet, the MUA duct and a portion of the intake conduit defining a MUA air flow path upstream of the intake passage; and
    a filter tray received within the intake conduit along the MUA air flow path, the filter tray defining a filter reception zone within the intake conduit to receive a filter cartridge therein, the filter reception zone being in downstream fluid communication with the secondary air inlet and upstream fluid communication with the intake passage wherein the primary air inlet is coaxial with the indoor inlet, and wherein the secondary air inlet is perpendicular to the primary air inlet and positioned above the primary air inlet.

2. The single-package air conditioner unit of claim 1, wherein the filter tray further defines a dispersion gap, the dispersion gap being provided within the intake conduit along the MUA air flow path upstream from the filter reception zone.

3. The single-package air conditioner unit of claim 2, wherein a width of the dispersion gap along the lateral direction is equal to a width of the filter reception zone.

4. The single-package air conditioner unit of claim 2, wherein a height of the dispersion gap along the vertical direction is greater than a height of the filter reception zone.

5. The single-package air conditioner unit of claim 2,
    wherein the MUA duct is disposed on the outer surface of the housing, and
    wherein the MUA duct is in upstream fluid communication with the dispersion gap to direct air thereto.

6. The single-package air conditioner unit of claim 5, wherein a cross-sectional area of the MUA duct along the MUA air flow path is less than a cross-sectional area of the dispersion gap along the MUA air flow path.

7. The single-package air conditioner unit of claim 1, wherein the filter tray comprises:
    a main body panel; and
    a plurality of flanges extending from the main body panel toward the housing, the plurality of flanges defining a tray aperture to permit air therethrough, wherein the plurality of flanges selectively support the filter cartridge thereon within the filter reception zone.

8. The single-package air conditioner unit of claim 7, wherein the main body panel comprises:
    a front panel extending along the lateral direction; and
    a pair of side panels extending from the front panel along the transverse direction from opposite lateral ends of the front panel toward the housing.

9. The single-package air conditioner unit of claim 8, wherein the plurality of flanges comprises:
    a front flange extending toward the housing from a bottom of the front panel; and
    a pair of side flanges extending toward the housing from a bottom of the pair of side panels.

10. The single-package air conditioner unit of claim 1, further comprising a filter panel disposed on the intake conduit in upstream fluid communication with the intake passage apart from the MUA air flow path.

11. The single-package air conditioner unit of claim 10, wherein the filter panel is disposed in front of the primary air inlet and in fluid communication with the primary air inlet, and
    wherein the filter panel is spaced apart from the secondary air inlet.

12. A single-package air conditioner unit defining a vertical direction, a lateral direction, and a transverse direction, the single-package air conditioner unit comprising:
    a housing comprising an outdoor portion and an indoor portion, the indoor portion defining an indoor inlet for receipt of indoor air;
    an outdoor heat exchanger assembly disposed in the outdoor portion and comprising an outdoor heat exchanger and an outdoor fan;
    an indoor heat exchanger assembly disposed in the indoor portion and comprising an indoor heat exchanger and an indoor fan, the indoor heat exchanger being in downstream fluid communication with the indoor inlet;
    an intake conduit mounted to an outer surface of the housing, the intake conduit defining an intake passage upstream from the indoor inlet, the intake conduit further defining a primary air inlet upstream of the intake passage and a secondary air inlet upstream of the intake passage, the secondary air inlet being non-sequential with the primary air inlet;
    a make-up air (MUA) duct for directing outdoor air to the indoor portion, the MUA duct in upstream fluid communication with the secondary air inlet, the MUA duct and a portion of the intake conduit defining a MUA air flow path upstream of the intake passage;

a filter tray removably received within the intake conduit along the MUA air flow path, the filter tray defining a filter reception zone within the intake conduit to receive a filter cartridge therein, the filter reception zone being in downstream fluid communication with the secondary air inlet and upstream fluid communication with the intake passage, wherein the secondary air inlet has a minimum airflow cross-section that is less than a minimum airflow cross-section of the primary air inlet, and wherein an air flow direction of the secondary air inlet is different from an air flow direction of the primary air inlet; and a filter panel disposed on the intake conduit in fluid communication with the intake passage apart from the MUA air flow path, wherein the filter panel is disposed in front of the primary air inlet and in fluid communication with the primary air inlet, and wherein the filter panel is spaced apart from the secondary air inlet.

13. The single-package air conditioner unit of claim 12, wherein the filter tray further defines a dispersion gap, the dispersion gap being provided within the intake conduit along the MUA air flow path upstream from the filter reception zone.

14. The single-package air conditioner unit of claim 13, wherein a width of the dispersion gap along the lateral direction is equal to a width of the filter reception zone.

15. The single-package air conditioner unit of claim 13, wherein a height of the dispersion gap along the vertical direction is greater than a height of the filter reception zone.

16. The single-package air conditioner unit of claim 12, wherein the filter tray comprises:
a main body panel; and
a plurality of flanges extending from the main body panel toward the housing, the plurality of flanges defining a tray aperture to permit air therethrough, wherein the plurality of flanges selectively supports the filter cartridge thereon within the filter reception zone.

17. The single-package air conditioner unit of claim 16, wherein the main body panel comprises:
a front panel extending along the lateral direction; and
a pair of side panels extending from the front panel along the transverse direction from opposite lateral ends of the front panel toward the housing.

18. The single-package air conditioner unit of claim 17, wherein the plurality of flanges comprises:
a front flange extending toward the housing from a bottom of the front panel; and
a pair of side flanges extending toward the housing from a bottom of the pair of side panels.

* * * * *